United States Patent
Bruck et al.

(10) Patent No.: US 6,644,746 B2
(45) Date of Patent: Nov. 11, 2003

(54) SEAT INTEGRATED LATCH RECLINER ASSEMBLY WITH INERTIAL LOCKING MECHANISM

(75) Inventors: Stephen C. Bruck, Fraser, MI (US); Tyrone Secord, Troy, MI (US); Keith Brantley, Utica, MI (US)

(73) Assignee: BAE Industries, Inc., Centerline, MI (US)

( * ) Notice: Subject to any disclaimer, the term of this patent is extended or adjusted under 35 U.S.C. 154(b) by 125 days.

(21) Appl. No.: 09/938,986

(22) Filed: Aug. 24, 2001

(65) Prior Publication Data

US 2002/0089225 A1 Jul. 11, 2002

Related U.S. Application Data

(63) Continuation-in-part of application No. 09/758,780, filed on Jan. 11, 2001.

(51) Int. Cl.[7] ................................................ B60N 2/02
(52) U.S. Cl. ................................................ 297/378.11
(58) Field of Search .................. 297/378.11, 378.12, 297/378.14, 216.1, 216.13, 216.14

(56) References Cited

U.S. PATENT DOCUMENTS

| | | | |
|---|---|---|---|
| 4,082,353 A | 4/1978 | Hollowell | |
| 4,103,970 A | 8/1978 | Homier | |
| 4,225,177 A | 9/1980 | Kluting | |
| 4,366,984 A | 1/1983 | Klueting et al. | |
| 4,438,974 A | * 3/1984 | Kresky et al. | |
| 4,747,641 A | * 5/1988 | Bell | 297/367 X |
| 5,163,735 A | 11/1992 | Aljundi | |
| 5,265,937 A | 11/1993 | Allen | |
| 5,328,241 A | 7/1994 | Haider | |
| 5,460,429 A | 10/1995 | Whalen | |
| 5,522,643 A | * 6/1996 | Matsuura | 297/367 |
| 5,556,159 A | 9/1996 | Canteleux | |
| 5,842,744 A | 12/1998 | Harmon | |
| 5,882,080 A | * 3/1999 | Houghtaling et al. | 297/378.11 |
| 5,961,183 A | 10/1999 | Smith et al. | |
| 6,019,430 A | 2/2000 | Magyar et al. | |
| 6,209,955 B1 | * 4/2001 | Seibold | 297/216.13 |
| 6,345,867 B1 | * 2/2002 | Hellrung et al. | 297/336 |
| 6,502,903 B2 | * 1/2003 | Bruck et al. | 297/378.11 |

* cited by examiner

Primary Examiner—Peter M. Cuomo
Assistant Examiner—Stephen Vu
(74) Attorney, Agent, or Firm—Gifford, Krass, Groh, Sprinkle, Anderson & Citkowski, P.C.

(57) ABSTRACT

A latch assembly for maintaining a seat back in upright position responsive to inertial loads. Support plates include hinged upwardly extending arms defining a seat back. A latch gear includes a first plurality of exteriorly arrayed teeth. A first cam operates a second pivotal cam so that, upon rotation, the second cam rotates in an opposite direction to move into and out of contact with a pawl. The pawl is pivotally and translatably secured to the support plates and includes additional teeth arrayed opposite to the latch gear teeth and an extending end with an upwardly/arcuate shape. A wedge block defines first and second shoulder supports. In operation, the pawl engages the first support surface of the block. In response to inertial loads, the pawl shifts radially to be engaged upon the second support surface, the pawl teeth being forcibly interengaged with the latch gear teeth.

14 Claims, 4 Drawing Sheets

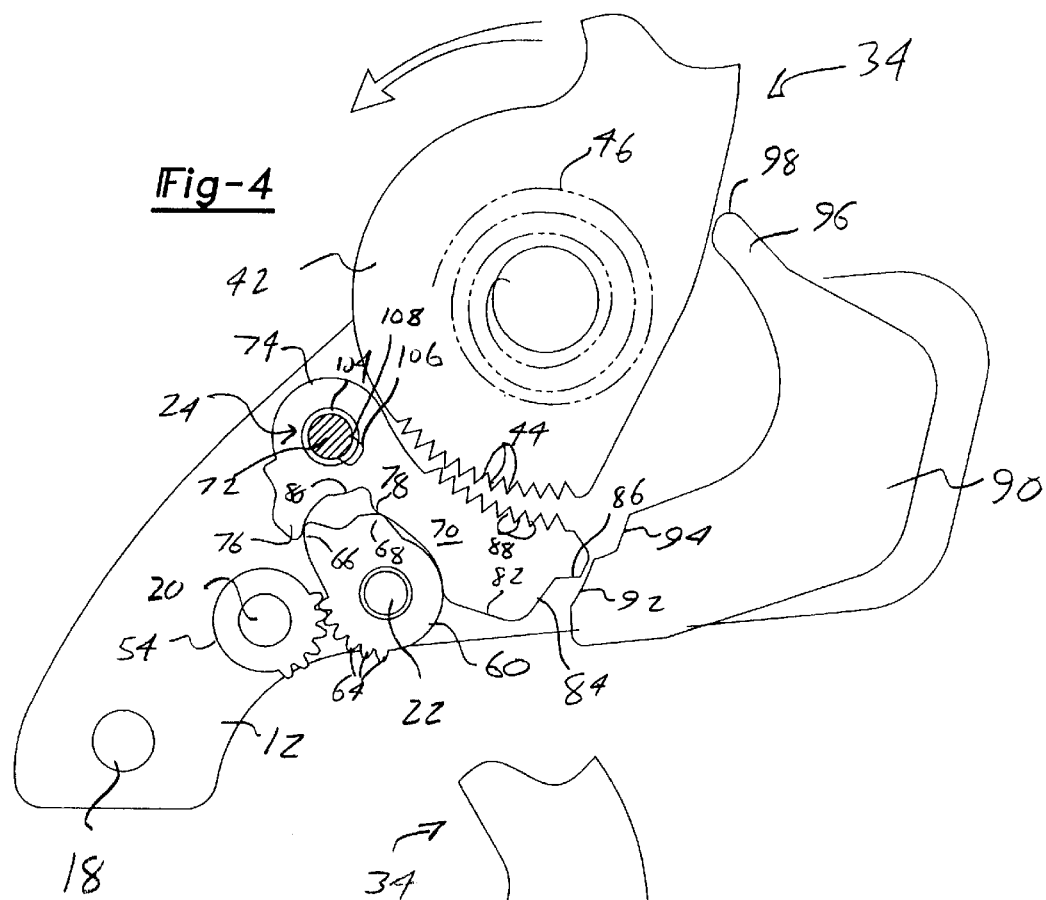
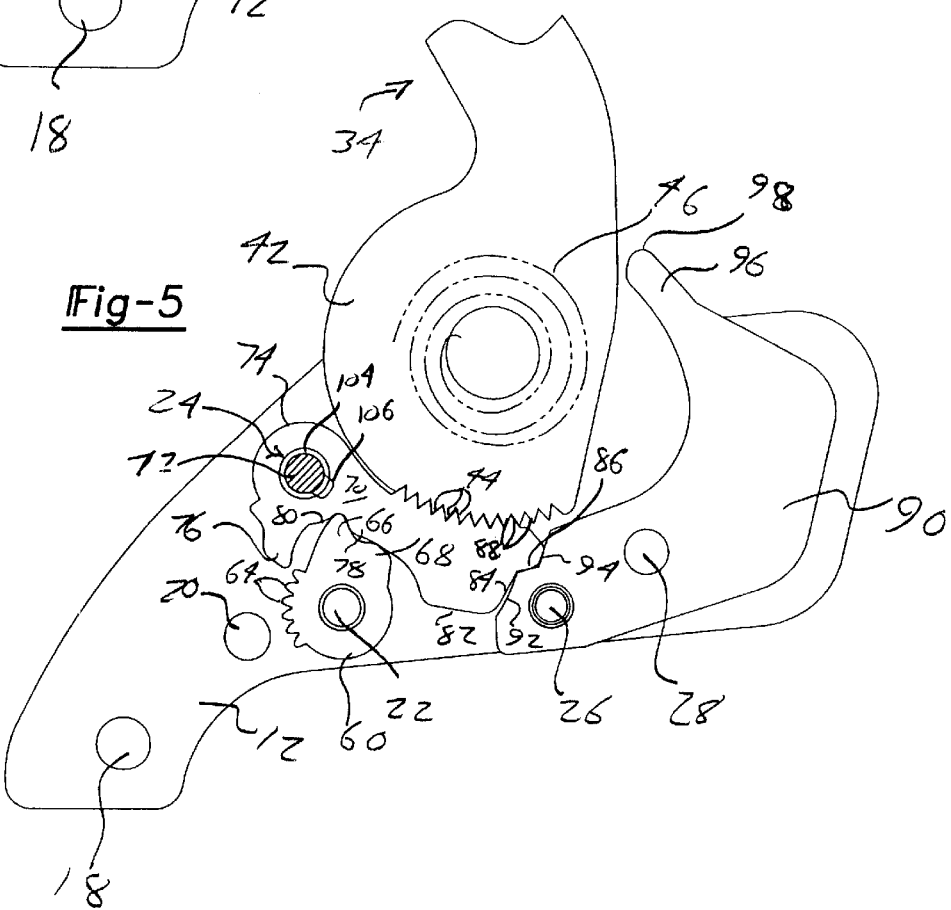

SEAT INTEGRATED LATCH RECLINER ASSEMBLY WITH INERTIAL LOCKING MECHANISM

CROSS REFERENCE TO RELATED APPLICATIONS

The present application is a continuation-in-part of U.S. application Ser. No. 09/758,780, filed Jan. 11, 2001, for a Seat Integrated Latch Recliner Assembly with Inertial Locking Mechanism.

BACKGROUND OF THE INVENTION

1. Field of the Invention

The present invention relates generally to seat integrated recliner latch assemblies. More particularly, the present invention is directed to a further improved recliner latch assembly incorporating a radially shiftable and yielding pawl, incorporating a deformable and substantially "peanut shaped" configuration, and within which is mounted a solid rivet, in combination with a fixedly positioned wedge block for creating an upward directing force on the pawl to maintain a toothed engagement with an upwardly extending and rotatably mounted seatback.

2. Description of the Prior Art

The prior art is well documented with examples of vehicle seat recliner mechanisms and, in particular, those which employ some form of inertial locking or restraining mechanism responsive to a determined force exertion and for the purpose of maintaining the seat back in an upright locked position. U.S. Pat. No. 5,163,735, issued to Aljundi, discloses an inertia latch for a vehicle seat backrest which includes a wheel having a pinion gear formed thereon and which engages sector plate teeth of a backrest bracket portion. As the backrest is shifted on rapid deceleration, the wheel rapidly drives a locking tooth into engagement with a locking pawl at the lower end of the inertia pendulum. The inertia pendulum is rotated upon application of an inertial load into an interlocking relationship with the locking tooth. A tilt control pinion gear engages a tilt sector plate to adjust the orientation of the seat back relative to the seat bottom.

U.S. Pat. No. 4,082,353, issued to Hollowell, teaches another variation of an inertia-responsive vehicle seat back latch mechanism for a vehicle seat assembly and including a seat back pivotally supported for forwardly tilting movement. The latch mechanism includes a seat back stud movable with the seat back, a locking pawl pivotally attached to the seat cushion support which is adapted to engage the seat back stud, and a latching pawl pivotally attached to the seat cushion support for preventing rotation of the locking pawl. The locking pawl is disposed to engage the seat back stud, but is cammable free of the seat back stud thereby allowing forward tilting of the seat back. During a vehicle deceleration greater than a predetermined value, the latching pawl prevents rotation of the locking pawl by engaging the locking pawl with the seat back and preventing forward tilting of the seat back.

Additional examples of vehicle seat back inertial locking devices are illustrated by U.S. Pat. No. 5,460,429, issued to Whalen, and U.S. Pat. No. 4,225,177, issued to Klutting. U.S. Pat. No. 5,328,241, issued to Haider, teaches a recliner for a vehicle seat assembly in which the locking pawl of the recliner is formed with teeth configured to resist damage when the seat back is rotated to a forward dump position. The pawl teeth are disclosed as being progressively longer, from the end of the pawl inward, over a selected number of teeth and so that the teeth resist bending deformation caused by impact with the latch gear end face.

SUMMARY OF THE PRESENT INVENTION

The present invention is a novel seat integrated restraint latch assembly with built-in inertial locking mechanism for maintaining a seat back of the seat in an upright position responsive to an experienced inertial load (also referenced as a "crash load"). Applicant further believes the design of the instant invention to set a new industry standard of load capability for a belted seat back latch/recliner mechanism.

The seat includes a frame constructed of a seat bottom and an upwardly extending and pivotally secured seat back. One or more pairs of spaced apart support plates are fixedly secured to the seat bottom and define a portion of the seat assembly.

The seat back is further defined in part by an extending arm pivotally connected to the support plates. The extending arm is preferably reinforced proximate the hinged and pivotal connection and so that, upon experiencing the inertial load, engages against an extending flange of one or both of the support plates and to prevent the arm from bending. A spring biased latch gear is mounted to the arm at the hinged connection and includes an exterior facing surface defied, in part, by a first plurality of teeth.

A first cam is actuated by a lever projecting from one facing side of a selected support plate of the seat frame. The first cam is pivotally secured between the support plates at a first specified location and is spring biased in a selected rotation direction. A second cam is likewise pivotally secured between the support plates at a second location. The first and second cams are configured with associated and matingly engaging, spaced apart finger portions such that, upon actuation and rotation of the first cam in a given direction, the second cam is influenced to rotate in an opposite direction.

A pawl is pivotally secured to the support bracket at a third location and is engageable by the second cam during normal operation. A solid pin extends through substantially "peanut shaped" apertures defined in the plates and the pawl disposed therebetween. The pawl further includes a second plurality of teeth arrayed in opposing fashion relative to the first plurality of teeth of the latch gear and an extending end configuration further defined by an upwardly and arcuately extending surface.

A wedge block is fixedly secured between the support plates at a fourth location. The wedge block includes, in the preferred variant, first and second shoulder support shoulder support surfaces which are configured in a stepped arrangement in opposing fashion to the extending end configuration of the pawl. The extending end configuration of the pawl is arrayed in slightly spaced and proximate fashion relative to the step in the wedge block, as defined by the support surfaces upon being rotated from a first latched position to a second disengaged position, and at which point the seat back may be rotationally readjusted relative to the support plates of the seat bottom.

The substantially "peanut shaped" apertures defined in the spaced apart support plates further include a first substantially circular shaped section and a second substantially circular shaped section communicating with the first circular section by a narrowed boundary disposed therebetween. The second circular shaped section is, in the preferred embodiment, substantially smaller in dimension than the first circular section and so that, upon inertial shifting of the pawl, the solid rivet tends to intentionally deform the support plates as it forces its way past the narrowed boundary and into the smaller dimensioned and second substantially circular shaped section and to thereby prevent any undesirable rebounding/backwards motion of the seat resulting from recoil forces following the initial forward impact. Also, the provision of a solid pin (or rivet), and as opposed to one that it hollowed internally, prevents shearing of the pin and resulting loss of integrity of the seatback in the crash position.

At this point, the extending end configuration engages upon the second and succeeding shoulder support surface and the second arrayed plurality of teeth of pawl are forcibly pressed into inter-engaging contact against the first plurality of teeth of the latch gear. Additional upward engagement against the pawl is further contributed by at least the second cam in the deformed and inertial loaded position.

BRIEF DESCRIPTION OF THE DRAWINGS

Reference will now be made to the attached drawings, when read in combination with the following detailed description, wherein like reference numerals refer to like parts throughout the several views, and in which:

FIG. 4 is a third plan view illustrating the pawl, by virtue of the first and second cams, being actuated to a disengaged position relative to the latch gear; and FIG. 5 is fourth plan view illustrating the pawl in a laterally shifted position in response to a deformed and inertial loaded position and in which an extending end configuration of the pawl is seated upon the stepped shoulder support surface of the wedge block and so that an arrayed plurality teeth of the pawl are forcibly inter-engaged with an arrayed plurality of teeth of the latch gear to immovably restrain the arm.

DETAILED DESCRIPTION OF THE PREFERRED EMBODIMENT

Figure 1:
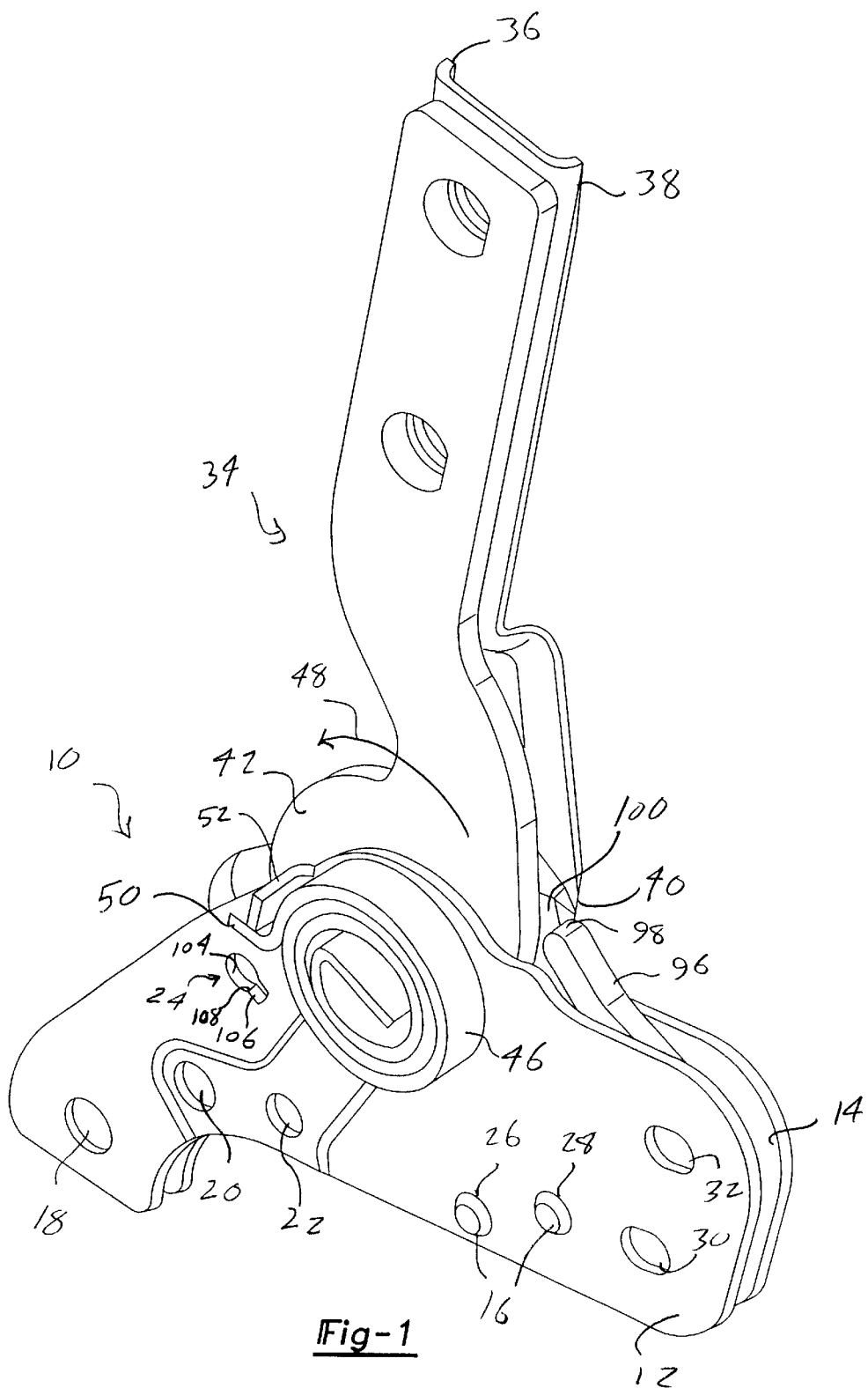
FIG. 1 is an elevational view of the components of the seat frame within which the present latch assembly is incorporated, the seat frame including the pair of spaced apart support plates defining part of the seat bottom and the upwardly extending and rotatably associated arm forming a portion of the vehicle seat back.

With reference now to FIG. 1, a portion of a vehicle frame is illustrated at 10 and which incorporates an improved and inertial locking latch assembly according to the present invention. As previously described, the latch assembly according to the present invention also provides an additional factor of safety in that its construction prevents reverse/rebounding actuation of a seatback following the experience of an inertial collision force.

The frame 10 includes, in the preferred embodiment, a lower support bracket defined by a pair of generally planar shaped and supporting plates 12 and 14. The support plates 12 and 14 are each preferably constructed of a sturdy, yet deformable steel material, and are preferably separated a spaced distance from one another by one or more spacer elements such as rivets 16.

It is however further understood that a suitable support plate or bracket can be configured in other shapes without departing from the scope of the invention and it also envisioned that, rather than a pair of spaced apart plates 12 and 14, a single appropriately configured plate can be utilized with the latching assembly according to the present invention and which will be subsequently described. It is further envisioned that the support plates 12 and 14 (and associated latching assembly) can be provided on a single side of a vehicle seat; however, and for larger 60/40 rear seat constructions (and such as is commonly used for second and third row seats in sport utility vehicles) a pair of support plates/latching assemblies may be provided on both sides of the seat.

Additionally, and while not illustrated, it is understood that the support plates may further be defined by an appropriate extending flange edge to provide an added measure of reinforcement against twisting forces of the seatback. Although not further shown, the support plates 12 and 14 are also understood to define a part of a conventional seat bottom of the seat frame and may also be secured to a floor of the vehicle interior, such as with the use of rivets, collar spacers and/or bolt fasteners (not shown) engaged through apertures 18 arranged in aligning fashion through selected and spaced apart plates 12 and 14.

Referring again to FIG. 1, an additional plurality of aligning apertures are defined within the spaced apart support plates 12 and 14 and at selected locations. Specifically, aligning and spaced apart pairs of apertures 20, 22, 24, 26 (corresponding with rivet 16), 28 (corresponding with additional rivet 16), 30 and 32 are indicated. It is further understood that each pair of aligning apertures may further be defined by a projecting collared portion extending between the spaced apart plates 12 and 14 and the purpose for the arrangement and placement of the additional plurality of apertures will be further described below.

An upwardly extending arm 34 is provided, constructed of an appropriate grade steel or like material, and hingedly/pivotally connected in sandwiching fashion between the support plates 12 and 14, such as through the use of a mounting collar of fastener (not shown) located at the lower end of the arm 34. The arm 34 is reinforced by first 36 and second 38 projecting and axially extending edges which terminate in a conjoined edge (see as best illustrated at 40) projecting around the hinged connection and which, upon experiencing an inertial load, engages against a flange edge of one of the support plates 12 and 14 to prevent the arm 34 from bending.

Figure 2:
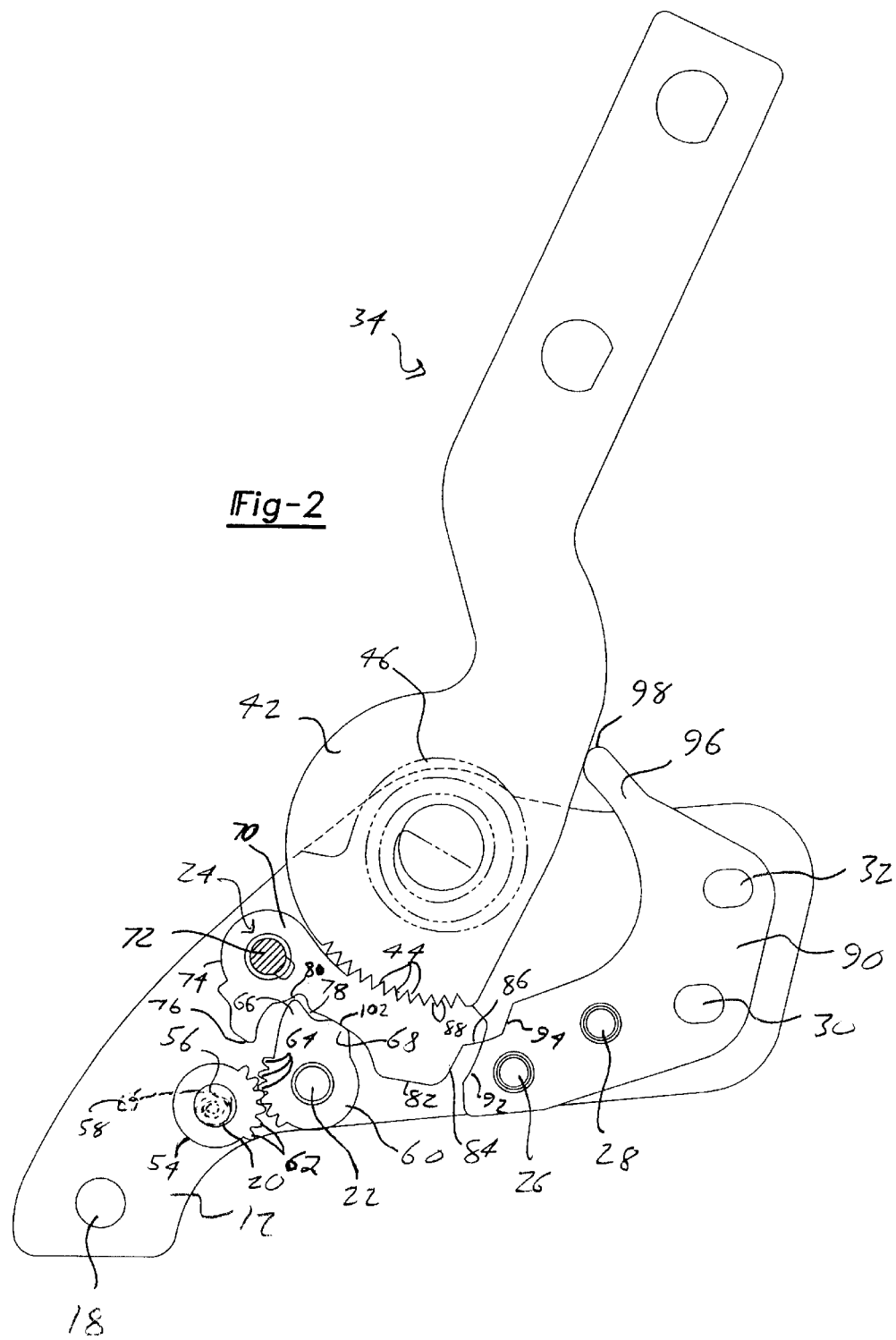
FIG. 2 is a first plan view of the seatback arm latch gear, first and second cams, laterally shiftable pawl and fixed wedge block mounted in sandwiched fashion between the support plates and illustrated in a first latched and maximum reclined position.
Figure 3:
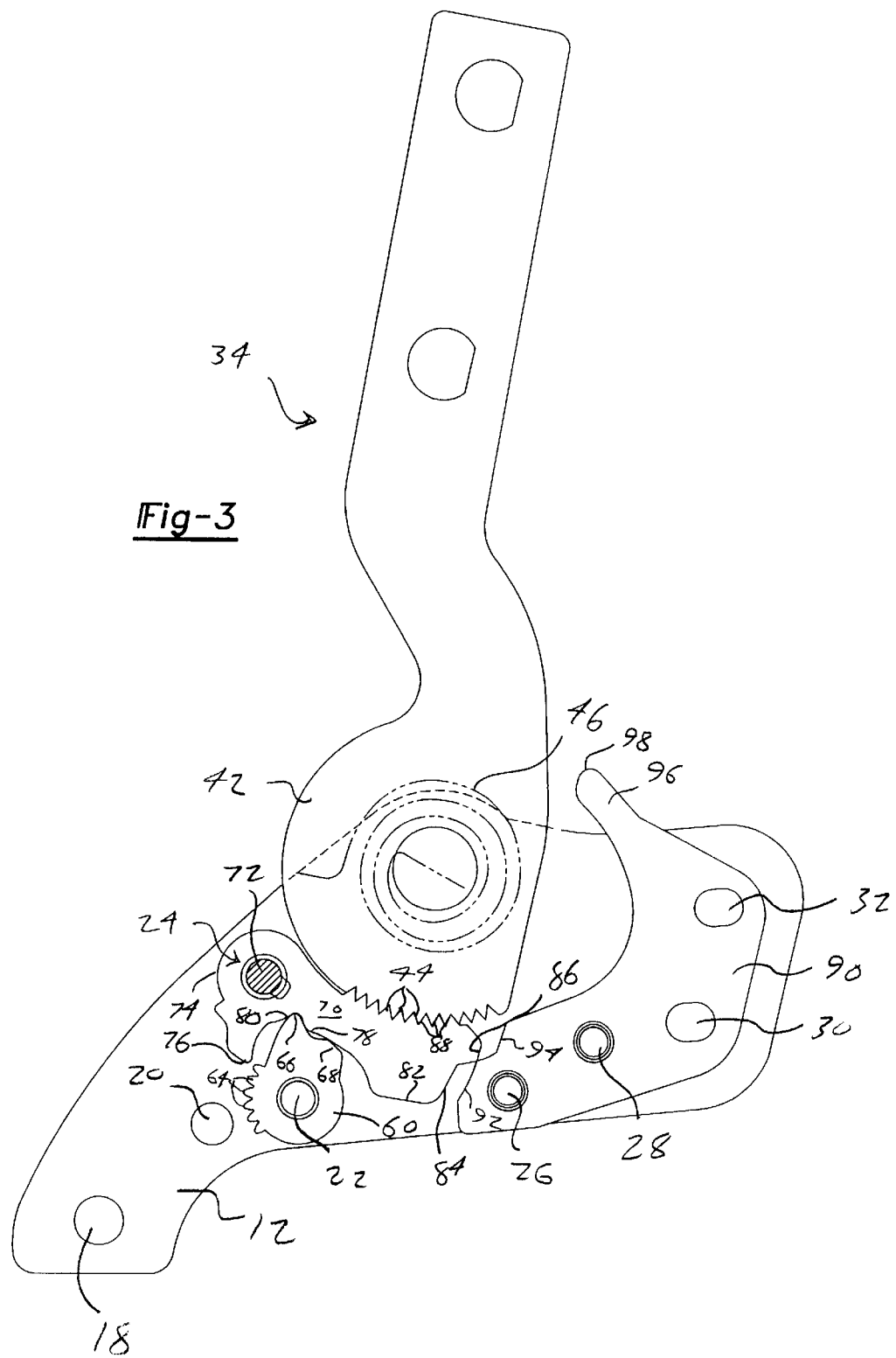
FIG. 3 is a second plan view illustrating the seatback in a further and forwardly rotated and latched position.

Referring to FIGS. 2, 3 and 4 in succession, a latch gear 42 is illustrated which is secured to the arm 34 at the hinged connection and such as by pins, mounting fasteners or the like (not shown). The latch gear 42 includes a substantially rounded exterior surface and which is defined, over a selected range, by a selected plurality of teeth 44.

A coil spring, illustrated at 46 in FIG. 1, spring biases the latch gear 42 (and overall seatback arm 34) in a given rotational direction, such as a counterclockwise direction as evidenced by directional arrow 48 in FIG. 1 and throughout the drawing figures. The spring 46 surrounds the pivotal mounting location of the latch gear 42, and in one preferred embodiment is located on the outwardly facing side of the first (or outer) support plate 12. An outermost spiraled and coiled end (or tang) 50 of the spring 46 is illustrated in FIG. 1 engaging in abutting fashion against a tabbed portion 52 extending from the support plate 12 and which influences the seat back 34 to pivot in a forward direction.

Having described in sufficient detail the aspects of the seat frame and seat back components, discussion will now be had as to the construction of the latch assembly according to the present invention. Specifically, a first cam 54 (refer to selected views FIGS. 2 and 4) is mounted over collared portion or like pin fastener or rivet associated with the pair of apertures 20 in the first 12 and second 14 plates and preferably in sandwiched fashion between the plates. The first cam 54 is further spring biased (by coil spring 56 illustrated in phantom in FIG. 2 and tabbed against phantom illustrated aperture 58 in plate 12) in a counterclockwise direction. In the preferred embodiment, the first cam 54 forms a portion of a rotatably actuated lever (not illustrated) projecting from the side of the seat bottom and by which the user may actuated the latch assembly in normal operation.

A second cam 60 is mounted over the collared portion or other suitable fastener extending between aligned apertures 22 in the plates 12 and 14 and in similar fashion as the first cam 54 and so that the first cam 54 and second cam 60 rotatably engage one another. This is accomplished by an exterior configuration of the first cam 54 being defined, in part, by a first plurality of spaced apart fingers 62 which meshingly and matingly engaged a corresponding second plurality of spaced apart fingers 64 arranged at a specified external configuration location of the second cam 60 and so that, upon rotation of the first cam 54 in such as a clockwise direction, the second cam 60 is engageably rotated in a reverse and counterclockwise fashion. The external configuration of the second cam 60 is further defined by a first projecting location 66 and a second projecting location 68, the purpose for which will be subsequently described.

A pawl 70 is provided as a substantially elongated member and which is mounted by a solid rivet 72 extending through the pawl 70 and engaging through each of the aligning apertures generally illustrated at 24 for the first 12 and second 14 support plates and so as to mount the pawl 70 in likewise sandwiching fashion between the support plates 12 and 14 and in both pivotal and translational fashion. Each of the apertures 24 is further constructed as a substantially "peanut shaped" aperture as best illustrated in FIG. 1 and a more detailed description will be had below, and with further reference to the crash position of the latch assembly of FIG. 4, of the interacting of the peanut shaped apertures 24 and the solid extending rivet 72.

The elongate extending body of the pawl 70 includes a substantially rounded end 74 which it is rotatably engaged to the solid rivet 72. Additional characteristics of the pawl 70 include a uniquely configured projections 76 and 78 and alternating recess 80 defined in a downwardly facing surface and which precedes a substantially arcuate extending surface 82 terminating in an extending end configuration. The end configuration of the pawl 70 is further defined by a stepped support surfaces 84 and 86. Defined in an opposite and upwardly facing surface of the pawl 70, and along a selected range, is a plurality of teeth 88.

A wedge block 90 is fixedly secured in sandwiching fashion between the support plates 12 and 14 at the location defined by the rivets 16 extending through the apertures 26 and 28, as well as additional collared projections (see in particular FIG. 2, 3 or 5), spacers or like fasteners associated with corresponding spaced apart apertures 30 and 32. Again, mounting pins or the like (not shown) may be employed to securely mount the wedge block 90 in place and it is understood that the wedge block 90 is fixedly secured between the plates 12 and 14.

The wedge block 90 is arranged in an opposing fashion relative to the extending end configuration (stepped surfaces 84 and 86) of the pawl 70 and the wedge block 90 likewise includes a first shoulder support surface 92 and a second shoulder support surface 94 stepped upwardly from the first support surface 88. The wedge block 90 also includes an extending and abutment portion 96 which is angled in an upward and forward direction towards the seatback arm 34 and which terminates in a rounded edge 98.

As best illustrated in FIG. 1, a rear location 100 of the seatback 34 abuts the rounded upper edge 98 of the wedge block 90 and to prevent the seatback 34 from being reclined beyond a certain point. This is especially significant when considering the application of the seat reclining mechanisms in second and third row vehicle seats and one preferred variant contemplates a maximum of approximately 16° incline of the seatback relative to a vertical axis. It is however understood that the degree of inclination permitted of the seatback 34 may be adjusted and/or the extending portion 96 deleted from the wedge block 90 without departing from the scope of the invention.

Referring again to FIG. 2, the configuration of the downwardly facing surface of the pawl 70 (and in particular a succeeding projection location 102 78) is illustrated seated upon second projecting location 68 of the second cam 60 and so that the plurality of upwardly facing teeth 88 are maintained in the specified and interengaging relationship with the opposing plurality of teeth 44 associated with the latch gear 42. Referring further to FIG. 3, a succeeding latched position of the seatback 34 is again shown and in which the first projecting location 66 of the second cam 60 is seated within associated recess 80 in the underside of the pawl 70. The first cam 54 is deleted from the illustrations of FIGS. 3 and 5 for purposes of clarity of illustration, however it is understood that the first cam 54 may be rotated by the user (through engagement of the corresponding handle) and in order to actuated the cams 54, 60 and pawl 70 in normal operation of the latch assembly.

Upon actuating the first 54 and second 60 cams in the manner illustrated by FIG. 4, the first 66 and second 68 projecting locations of the second cam 62 are rotated in the counterclockwise direction relative to the pawl 70, thus unseating from the recess 80 in the downwardly facing surface and in which the first projecting location 66 engages configured projection 76 of the pawl and the second projecting location 68 likewise engages against projection 78. This in turn causes the upwardly facing teeth 88 of the pawl 70 to drop out of engagement with the teeth 44 of the latch gear 42. Concurrently, the arcuately extending surface 82 (and proximate the end configuration 84 and 86 of the pawl 70) is illustrated in slightly spaced apart and proximate fashion relative to the first 92 of the stepped shoulders associated with the wedge block 90.

Referring now to FIG. 5, an explanation will now be provided as to how, upon the occurrence of an inertial load (or which is otherwise termed a "crash load"), the latch assembly of the present invention provides a securely seating or wedging support of the teeth 88 of the pawl 70 against the teeth 44 of the opposing latch gear 42. Specifically, and referring again to FIG. 1, the aligning and generally indicated, peanut shaped apertures 24 are again illustrated in both the support plates 12 and 14. As also previously described, the solid rivet 72 extends through an aperture (not shown) through the pawl 70 at the location of the rounded end 74. Alternatively, the rivet 72 may be fixedly secured in oppositely extending fashion to both sides of the pawl 70 without departing from the scope of the invention.

The peanut shaped apertures 24 in the plates 12 and 14, again best illustrated in FIG. 1 through the first such plate 12, further includes a first substantially circular shaped section 104 and a second substantially circular shaped section 106 communicating with the first circular section by a narrowed boundary 108 disposed therebetween. The pin 72 remains seated in the first 104, and larger, circular shaped section and so that the pawl 70 may operate in its normally pivoting manner as illustrated throughout FIGS. 2–4.

The second circular section 106, as clearly illustrated, is substantially smaller in dimension than the first circular section 104 such that, upon the occurrence of the inertial load, the solid pin or rivet 72 radially shifts across the narrowed boundary 108 to a position in which it substantially lies within the second circular section 106 (see again FIG. 5). At this point, the pawl 70 shifts in substantially translational fashion to the right and so that its succeeding stepped surface 86 is wedged in supporting fashion against the boundary between the stepped locations 92 and 94 of the opposing wedge block surface. Concurrently, projections 66 and 68 of the second cam 60 abuttingly engage the underside of the pawl 70 at the same locations previously identified in FIG. 3 and corresponding to the second normally latched position.

As discussed previously, an advantage of the present design includes the ability of the support plates 12 and 14 (as opposed to the pawl 70 and/or rivet 72) to deform in response to the solid rivet 72 forcibly shifting across the narrowed boundary 108 and to the second and smaller circular section 106. Deformation of the plates 12 and 14 is preferable to deformation and/or shearing of the pawl 70 or rivet 72 in that, upon occurrence of the latter, the mating teeth of the pawl 88 would disengage from those of the latch gear 42, with the result being the seatback 34 being free to rotate in a recoiling and reverse fashion in response to an initial crash load.

Having described our invention, it is apparent that it discloses a novel latch assembly a seat reclining mechanism and which is a novel improvement over the prior art in that it further provides an increased degree of holding support between the pawl and latch gear of the seat back and prevents accidental shearing of the pin/rivet 72 and/or release of the seatback 34 in a reverse/recoiling direction in response to a crash load. Additional preferred embodiments of the present latch assembly will become apparent to those skilled in the art and without deviating from the scope of the appended claims. In particular, it is envisioned that the latch assembly could be reconfigured to operate with a single cam element in place of the two cams disclosed in the preferred embodiment. Further, the shaping of the pawl, wedge block and range and positioning of the interengaging teeth can also be modified within the scope of the invention and it is again envisioned that the latch assembly could be configured for use with any of a single support plate, a pair of spaced apart support plates located on a given side of a vehicle seat. It is again envisioned that multiple latch assemblies could be configured for use with individual pairs of support plates located on either side of a vehicle seat or even at an intermediated location of a larger sized seat.

We claim:

1. A latch assembly adapted for use with a vehicle seat and forming a part of a reclining mechanism, the seat including a seat bottom and a pivotally engaged seat back, said latch assembly comprising:

a pair of inner and outer support plates forming a part of the seat bottom and adapted to be secured to at least one of first and second sides of the seat bottom;

the seat back including an upwardly extending arm hingedly connected between said pair of support plates, said arm being pivotally associated relative to said support plates, said arm further including a latch gear at a lower end thereof, an exterior facing surface of said latch gear being defined, in part, by a first plurality of teeth;

a first cam pivotally secured between said support plates at a first location and which is in operative engagement with a rotatable handle;

a second cam pivotally secured between said support plates at a second location and which is in pivotal engagement with said first cam, said first and second cams being configured so that, upon rotation of said first cam, said second cam rotates in an opposite direction;

a pawl secured in combined pivotal and translational fashion between said support plates at a third location, a solid pin extending between substantially peanut shaped apertures defined in said plates and engaging said pawl, said peanut shaped apertures in said plates each further comprising a first substantially circular shaped section and a second substantially circular shaped section communicating with said first circular section by a narrowed boundary disposed therebetween, said second circular section being substantially smaller in dimension than said first circular section, said pawl being engageable by said second cam in normal operation and including a second plurality of teeth arrayed in opposing fashion to said first plurality of teeth of said latch gear, said pawl further including an extending end configuration;

a wedge block fixedly secured between said support plates at a fourth location, said wedge block including at least one shoulder support surface; and responsive to a determined inertial load, said pawl shifting relative to said solid pin and so that said solid pin radially shifts across said narrowed boundary to said second circular section, said extending end configuration engages upon said at least one shoulder support surface and said second plurality of teeth of said pawl are forcibly engaged against said first plurality of teeth of said latch gear.

2. The latch assembly as described in claim 1, further comprising said first cam being spring biased in a selected rotational direction.

3. The latch assembly as described in claim 2, further comprising said latch gear being spring biased in a selected rotational direction.

4. The latch assembly as described in claim 1, an exterior configuration of said first cam including a first plurality of spaced apart fingers, a corresponding exterior configuration of said second cam including a second plurality of spaced apart fingers which meshingly engage with said first plurality of fingers of said first cam.

5. The latch assembly as described in claim 4, said second cam further comprising at least one projection engaging an underside surface of said pawl.

6. The latch assembly as described in claim 5, said underside surface of said pawl also engaging upon said second cam upon said pawl shifting relative to said pin.

7. The latch assembly as described in claim 1, said wedge block further comprising a first shoulder support surface and a second shoulder support surface, said extending end configuration of said pawl engaging said first support surface upon being rotated from a first latched position to a second disengaged position.

8. The latch assembly as described in claim 7, further comprising said extending end configuration engaging said second shoulder support surface upon lateral shifting of said pawl.

9. The latch assembly as described in claim 8, said wedge block further comprising an extending and abutment portion which contacts said upwardly extending arm when the seat back is pivoted to a rearward most position.

10. The latch assembly as described in claim 1, further comprising said support plates being arranged in spaced apart fashion, a plurality of apertures being formed through said support plates, a plurality of spacer pins extending through said apertures and securing said first cam, said second cam, said pawl and said wedge block at said associated first, second, third and fourth locations.

11. The latch assembly as described in claim 1, said upwardly extending arm further comprising reinforcement portions extending both along its axial length and proximate to said hinged connection with said support plates, said reinforcement portions, upon experiencing said inertial load, engaging against an extending flange edge of said support plates to assist in preventing said arm from bending.

12. The latch assembly as described in claim 11, said reinforcement portions further comprising first and second projecting and axially extending edges of said arm which terminate in a conjoined edge projecting around said hinged connection.

13. The latch assembly as described in claim 1, said extending end configuration of said pawl further comprising an upwardly and arcuately extending surface.

14. A latch assembly adapted for use with a vehicle seat, the seat having a frame with at least one support plate, an upwardly extending arm being hingedly connected to the support plate and defining part of a seat back of the vehicle seat, said latch assembly comprising:

a latch gear secured to said arm at said hinged connection, said latch gear including a first plurality of teeth;

at least one cam pivotally secured to said support plate;

a pawl secured in both pivotal and translational fashion to said support plate, a pin extending through a substantially peanut shaped aperture defined in said support plate and engaging said pawl, said pawl being engageable by said cam in normal operation and including a second plurality of teeth arrayed in opposing and engaging fashion with said first plurality of teeth of said latch gear, said pawl disengaging from said latch gear in response to said cam being rotated in a selected direction, said pawl further including an extending end configuration;

a wedge block fixedly secured to said support bracket at a location rearwardly of said pawl, said wedge block including at least one shoulder support surface; and said pawl shifting in a lateral direction in response to an inertial load so that said extending end configuration engages upon said shoulder support surface and said second plurality of teeth of said pawl are forcibly engaged against said first plurality of teeth of said latch gear.

\* \* \* \* \*